United States Patent [19]

Koleske et al.

[11] Patent Number: 4,920,156

[45] Date of Patent: Apr. 24, 1990

[54] BLENDS OF CYCLIC VINYL ETHER CONTAINING COMPOUNDS AND URETHANE ACRYLATES

[75] Inventors: Joseph V. Koleske; Claiborn L. Osborn, both of Charleston, W. Va.

[73] Assignee: Union Carbide Chemicals and Plastics Company Inc., Danbury, Conn.

[21] Appl. No.: 592,838

[22] Filed: Mar. 23, 1984

[51] Int. Cl.[5] ............... C08F 2/50; C08F 220/58; C08F 232/04; C08F 232/06

[52] U.S. Cl. .................... 522/31; 522/15; 522/95; 522/96; 522/97; 522/168; 522/169; 522/172; 526/266; 526/301; 528/361

[58] Field of Search ......... 526/266, 273; 528/361; 204/159.19; 522/31, 15, 95, 96, 97, 168, 169, 172

[56] References Cited

U.S. PATENT DOCUMENTS

| | | | |
|---|---|---|---|
| 2,877,208 | 3/1959 | Lal | 526/266 |
| 3,310,542 | 3/1967 | Ehrig | 526/266 |
| 3,311,574 | 3/1967 | Bowering | 526/266 |
| 3,441,561 | 4/1969 | Gazzard | 526/266 |
| 3,538,121 | 11/1970 | Gazzard | 526/266 |
| 3,784,594 | 1/1974 | Papa et al. | 526/266 |
| 3,794,576 | 2/1974 | Watt | 204/159.11 |
| 3,893,985 | 7/1975 | Papa et al. | 526/266 |
| 4,504,372 | 3/1985 | Kirchmayr | 204/159.15 |

FOREIGN PATENT DOCUMENTS 2073760 10/1981 United Kingdom .

OTHER PUBLICATIONS

Roffey, "Photopolymerization of Surface Coating", John Wiley & Sons, 1987, pp. 153–156.

Primary Examiner—John C. Bleutge
Assistant Examiner—Arthur H. Koeckert
Attorney, Agent, or Firm—Jean B. Mauro

[57] ABSTRACT

Described herein are compositions suitable for photocopolymerization comprising a cyclic vinyl ether containing compound and urethane acrylates. Photocurable coatings can be prepared from such composition and such coatings have markedly improved flexibility and impact resistant properties.

18 Claims, No Drawings

BLENDS OF CYCLIC VINYL ETHER CONTAINING COMPOUNDS AND URETHANE ACRYLATES

BACKGROUND OF THE INVENTION

It is well known that coatings play a useful role in the manufacture of a wide variety of useful articles. Unitl recently, nearly all coatings were formulated and applied by employment of an organic solvent, which often comprised a major portion of the total formulated coating. After the coating is applied to the article to be coated, the organic solvent is evaporated leaving the dried coating on the article to serve its decorative or functional purpose. This coating system has met with increasing disfavor as the cost of energy needed to evaporate the solvent at the rate required by industry increased, as the price of the solvent increased, and as the deleterious environmental effects of the evaporated solvent became better understood. In addition, governmental regulations have placed ever increasing restrictions on the amounts and types of solvents or organic volatiles permitted to escape into the atmosphere from coatings compositions. Systems aimed at solvent recovery to reduce pollution and conserve solvent have generally proven to be energy intensive and expensive.

Considerable efforts have been expended by those skilled in the art to develop coating compositions having a minimal amount of volatile organic components and this has led to development of powder coatings, radiation-curable coatings, water borne coatings and high solids coatings. In these recent developments, the amounts of organic solvents present are minimal and consequently there is little or no atmospheric pollution.

Among the new coating systems, radiation-curable coatings, usually cured with ionizing or nonionizing radiation such as ultraviolet light, electron beam, gamma rays, etc. offer a variety of advantages. They require only minimal energy to effect cure—change from liquid to solid state—they do not contain solvents, and thus do not cause deleterious effects to the environment, and they are cost effetive, since effectively all of the applied liquid is converted to a solid coating.

An important disadvantage of certain photocurable systems such as the acrylates is the frequent requirement that the curing process be conducted in an inert atmosphere because of the inhibiting effect of oxygen on the polymerization process.

Responding to such problems, those skilled in the art have devised photocurable coatings which cure through a mechanism termed cationic polymerization. In these systems, the starting materials are mixed with photoinitiators which form acid catalysts when exposed to ultraviolet light; the starting materials are therefore polymerized via cationic catalysis.

Epoxy resins, linear vinyl ethers, and cyclic vinyl ethers have been shown to be suitable starting materials for photocure via cationic polymerization, as disclosed in, for example, U.S. Pat. No. 3,794,576; the publication "New Monomers for Cationic UV-Curing", Conference Proceedings, Radiation Curing VI, pages 4–28, Sept. 20–23, 1982; and British publication GB 2,073,760A.

However, a photocurable coating composition that can be cured by cationic polymerization and having increased toughness over compositions as are currently known would be highly desirable.

THE INVENTION

It has now been found that photocurable coatings can be prepared from blends of cyclic vinyl ether containing compounds and a urethane acrylate. These photocurable coatings can be cured by cationic polymerization. These novel photocurable compositions cure to give coatings with markedly improved flexibility and impact resistant properties.

The cyclic vinyl ethers suitable for use in this invention include dihydropyranyl and/or di(dihydropyranyl) compounds.

The di-(dihydropyranyl) compounds employed in the present invention comprise two 3,4-dihydro-2H-pyranyl rings which are interconnected by a linking chain bonded at either end to the 2-position of the respective pyranyl rings. In simplified form, the preferred compounds for use in the present invention have the following general Formula A:

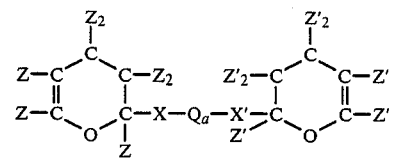

wherein:

the Z's each represents hydrogen or an alkyl group having from 1 to 10, and usually no more than 6, carbon atoms;

X and X' are members of the class consisting of a bivalent saturated hydrocarbon group, R, having the structure, $-C_nH_{2n}-$, wherein n is an integer having a value of from 1 to 10; an oxy radical, $-O-$; and a carbonyl group, $-C(O)-$; and, in addition X' may be a carbonyloxy group, $-O(O)C-$, the carbon atom of which is bonded to the 2-position of the dihydropyranyl ring; X and X' may be the same or different provided that taken together they contain either zero or 2 oxygen atoms;

a has a value of from zero to 1, a being zero only when X' is the aforesaid carbonyloxy group;

Q is a member of the class consisting of the aforesaid R group; a dioxylakylene group, $-ORO-$, wherein R is as defined above; a dicarboxylate group, $-OC-(O)-R'-C(O)O,-$ wherein R' is the nucleus of a dicarboxylic acid; and a polycarbamate group such as the dicarbamate group. $-OC(O)NH-R''-NH-C(O)O-$, wherein R'', as illustrated, is the nucleus of a diisocyanate; and X, X' and Q taken together is such that the linking chain, $-X-Q-X'-$, contains an even number of oxygen atoms from two to four, provided that when X and X' are both oxy radicals, the linking chain contains no other oxygen atoms (that is, Q or R), and when X and X' are both carbonyl groups, the linking chain contains four oxygen atoms (that is, Q is $-ORO-$).

Among the suitable di-(dihydropyranyl) compounds which are useful in accordance with the teachings of this invention are the following classes of compounds designated by Formulas A-1 through A-6 below.

1. 3,4-dihydro-2H-pyran-2-methyl(3,4-dihydro-2H-pyran-2-carboxylates) having the formula:

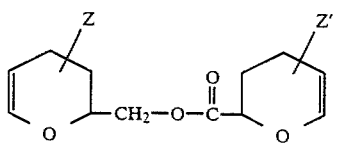

(A-1)

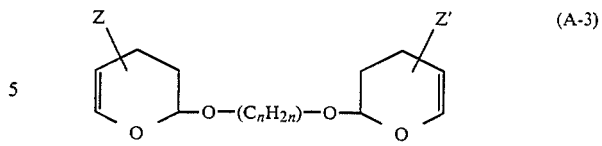

(A-3)

wherein the Z's are as above-defined. Preferably a total of from 5 to 7 of the respective Z groups are hydrogen and correspondingly, from 3 to zero are alkyl groups. When the Z's are alkyl groups, they are usually bonded to the 2- and/or 5-position of the respective rings. Typical examples of this class of reactants are: 3,4-dihydro-2-H-pyran-2-methyl(3,4-dihydro-2H-pyran-2-carboxylate) and corresponding alkyl-substituted compounds such as 3,4-dihydro-2,5-dimethyl-2H-pyran-2-methyl(3,4-dihydro-2,5-dimethyl-2H-pyran-2-carboxylate); 3,4-dihydro-2,5-diisobutyl-2H-pyran-2-methyl(3,4-dihydro-2,5-diisobutyl-2H-pyran-2-carboxylate); 3,4-dihydro-2,5-dihexyl-2H-pyran-2-methyl(3,4-dihydro-2,5-dihexyl-2H-pyran-2-carboxylate); and 3,4-dihydro-2,5-didecyl-2H-pyran-2-methyl(3,4-dihydro-2,5-didecyl-2H-pyran-2-carboxylate). The 3,4-dihydro-2H-pyran-2-methyl-(3,4-dihydro-2H-pyran-2-carboxylate) which is commonly referred to as acrolein tetramer is preferred and has the structure:

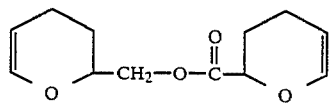

2. Alkanedioxy-bis(3',4'-dihydro-2'H-pyran-2'-carbonyl) compounds having the structure:

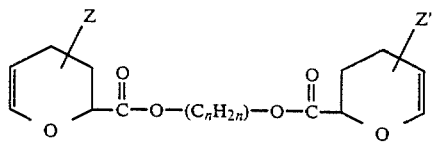

(A-2)

wherein the Z's are as above-discussed, and n is an integer from 1 to 10, preferably from 1 to 4. Typical examples of such compounds which are suitable in the practice of this invention are: 1,2-ethanedioxybis-(3',4'-dihydro-2'H-pyran-2'-carbonyl); 1,2-ethanedioxybis-(3',4'-dihydro-5'-methyl-2'H-pyran-2'-carbonyl), and corresponding 1,2-isopropanedioxy and 1,4-butanedioxy compounds. Such compounds are prepared by the reaction of an alkylene dihalide, X''—(C$_n$H$_{2n}$)—X'', wherein n is as aforesaid, and X'' is halogen, particularly iodine, chlorine or bromine, with the silver salt of a 3,4-dihydro-2H-pyran-2-carboxylic acid. The latter salts are in turn prepared by the oxidation of 3,4-dihydro-2H-pyran-2-carboxaldehyde in the presence of a silver salt such as silver oxide, preferably in an anhydrous medium containing an organic solvent such as benzene, as described in U.S. Pat. No. 2,514,172.

3. Bis-(3',4'-dihyro-2'H-pyran-2'-oxy) alkanes having the formula:

wherein the Z's and n have the significance discussed above. Illustrative compounds of this group of di-(dihydropyranyl) compounds are: 1,2-bis-(3',4'-dihydro-2'H-pyran-2'-oxy)ethane; 1,2-bis(3',4'-dihydro-5'-methyl-2'H-pyran-2'-oxy)ethane; 1,3-bis(3',4'-dihydro-5'-methyl-2'H-pyran-2'-oxy)propane; and 1,4-bis(3',4'-dihydro-2'H-pyran-2'-oxy)butane. Such compounds are prepared by Diels-Alder addition reactions of divinyl bisethers such as the divinyl ethers of alkylene glycols, with alpha, beta-unsaturated aldehydes such as acrolein and methacrolein under conditions described, for example, by Curtis W. Smoth et al., Journal of the American Chemical Society, Vol. 73, 5267 (1951). For example, the reaction between a mole of ethylene glycol divinyl ether and 2 moles of acrolein provides 1,2-bis(3'',4'-dihydro-2'H-pyran-2'-oxy)ethane.

4. Bis-(3',4'-dihydro-2'H-pyran-2'-alkoxy) alkanes having the formula:

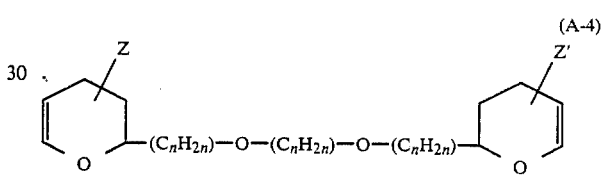

(A-4)

wherein the Z's and n are as defined hereinabove. Typical examples of this type of reactant are: 1,1-bis(3',4'-dihydro-2'H-pyran-2'-methoxy)ethane; 1,1-bis(3',4'-dihydro-5'-methyl-2'H-pyran-2'-methoxy)ethane; and 1,2-bis(3',4'-dihydro-2'H-pyran-2'-methoxy)ethane. Such compounds are prepared by the addition of alpha, beta-unsaturated aldehydes (such as, for example, acrolein and methacrolein) to the corresponding bis-unsaturated ethers.

5. Bis-(3',4'-dihydro-2'H-pyran-2'-alkyl)carboxylates having the general formula:

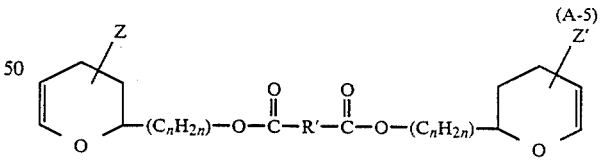

(A-5)

wherein Z, Z' and n are as above-defined; and R' is the nucleus of a dicarboxylic acid and may be a bivalent aliphatic, cycloaliphatic or aromatic nucleus including corresponding halogen-substituted nuclei. Thus, R' may be: a bivalent alkylene group, —(C$_{n°}$H$_{2n°}$)—, wherein n° is an integer of from 1 to 10 as in the saturated acyclic dibasic acid series, HOOC—(CH$_2$)$_{n°}$—COOH, an alkenylene group having from 2 to 10 carbon atoms as in maleic acid and itaconic acid; dimer or trimer acids, or mixtures thereof; an arylene group as in phthalic, isophthalic and terephthalic acids; an aralkylene nucleus as in homophthalic acid; cycloaliphatic nuclei as in the hydrophthalic acids including di-, tetra-, and hexahydrophthalic acids, and bicyclo[2.2.1]hept-5-ene-2,3- dicarboxylic acid; and corresponding halogenated nuclei as in chloromaleic acid, tetrachloro- and tetrabromophthalic acids and chlorobicyclo[2.2.1]-hept-5-ene-2,3- dicarboxylic acids such as chlorendic acid. Specific examples of this class of compounds are: bis-(3,4-dihydro-2H-pyran-2-methyl)-succinate, -adipate, -azelate, -sebacate, -tetrachlorophthalate, -tetrabromophthalate and -chlorendate. This type of reactant is prepared by the condensation of 3,4-dihydro-2H-pyranyl-2-alkanols with the dibasic acid or acid halide of the dibasic acid.

6. Poly-(3',4'-dihydro-2'H-pyran-2'-alkyl) carbamates which comprise the reaction products formed by condensation of 3,4-dihydro-2H-pyranyl-2-carbinols and an organic polyisocyanate such as those described below. Among the suitable polyisocyanates which may be used in the preparation of such monomers for use in the present invention are those having the formula, $R''(NCO)_i$, wherein i is an integer of two or more and $R''$ is an organic radical having the valence of i. $R''$ can be an aliphatic, cycloaliphatic or aromatic radical which may be unsubstituted hydrocarbyl groups or hydrocarbyl groups substituted, for example, with halogen or alkoxy groups. Thus, when i is two, for example, $R''$ is a bivalent substituted or unsubstituted hydrocarbon group such as alkylene, cycloalkylene, arylene, alkyl-substituted cycloalkylene, alkarylene, aralkylene and like groups. Typical examples of such polyisocyanates are: 1,6-hexamethylene diisocyanate; 1,4-tetramethylene diisocyanate; 1-methyl-2,4-diisocyanatocyclohexane; bis(4-isocyanatophenyl)methane; phenylene diisocyanates such as 4-methoxy-1,3-phenylenediisocyanate, 5,6-dimethyl-1,3-phenylenediisocyanate, 2,4-and 2,6- tolylene diisocyanates, crude tolylene diisocyanate, 6-isopropyl-1,3-phenylenediisocyanate, durylene diisocyanate, triphenylmethane-4,4',4''-triisocyanate, 3-isocyanatomethyl-3,5,5-trimethylcyclohexylisocyanate, 4,4'dicyclohexyl-methylene diisocyanate, or 4,4'-diphenylmethane diisocyanate, and many other organic polyisocyanates that are known in the art such as those disclosed in an article by Siefkin, Ann. 565,75 (1949). Also included as useful in the preparation of the carbamate monomers employed in this invention are the polyisocyanates of the aniline-formaldehyde polyaromatic type which are produced by phosgenation of the polyamine obtained by acid-catalyzed condensation of aniline with formaldehyde. Polyphenylmethylene polyisocyanates of this type are available commercially under such trade names as PAPI, AFPI, Mondur MR, Isonate 390P, NCO-120 and NCO-20. The products are low viscosity (50-500 centipoises at 25° C.) liquids having average isocyanato functionalities in the range of about 2.25 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates; and a mixture of isomeric tolylene diisocyanates with polymeric tolylene diisocyanates obtained as residues from the manufacture of the diisocyanates, and the like.

When the isocyanate which is reacted with the 3,4-dihydro-2H-pyran-2-carbinol contains two isocyanato functions, bis-(3',4'-dihydro-2'H-pyran-2-alkyl)dicarbamates are formed having the general formula:

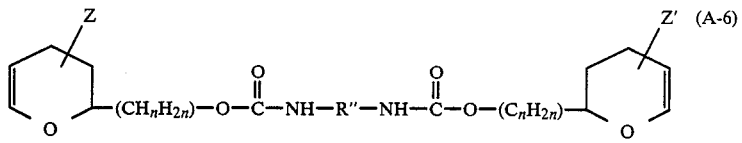 (A-6)

wherein the Z's and n are as defined hereinabove; and $R''$ corresponds to the $R''$ nucleus of the isocyanate reactant, $R''(NCO)_i$ when i is two. It is to be understood that when the isocyanate has an isocyanato function greater than two, the pyranyl monomer will have a corresponding average number of carbamate groups and the general formula:

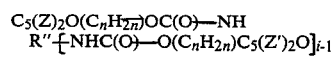

wherein $C_5(Z)_2O$ and $C_5(Z')_2O$ are the respective 3,4-dihydro-2H-pyranyl rings. Typical examples of this class of di-(dihydropyranyl) compounds are toluene-2,4-(or 2,6)-(bis-3',4'-dihydro-2'H-pyran-2'-methyl) carbamate, and the reaction products of 3,4-dihydro-2'H-pyranyl-2-carbinol with the aforesaid polymeric liquids having an average isocyanato function of about 2.25 to about 3.2.

It is, of course, understood by those skilled in the art that when such nitrogen containing compounds are used with photoinitiators, only minor amounts of basic organic nitrogen containing compounds may be used so as not to interfere with the polymerization reaction.

Additional cyclic vinyl ether compounds include the following:

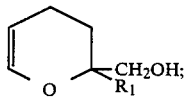

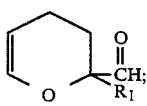

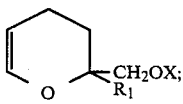

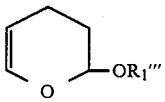

wherein $R_1$ is hydrogen or methyl, $R_1'''$ is alkyl of 1 to 10 carbon atoms and X is selected from

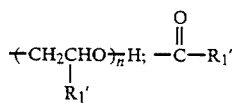

or

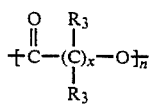

wherein n has a value of from 1 to 50 and wherein $R_1'$ is (1) hydrogen, (2) alkyl which is substituted with any substituent which does not unduly interfere with the polymerization, or unsubstituted, linear or branched, containing up to 20 carbon atoms, such as methyl, ethyl, isopropyl, decyl, eicosyl and the like, and (3) aryl which is substituted with any substituent which does not unduly interfere with the polymerization or, which is unsubstituted, having 6 to 10 ring carbon atoms, such as phenyl, napthyl, benzyl, penethyl, and the like.

Another group of compounds which are useful in the compositions of this invention are the alkylene oxide adducts of 3,4-dihydropyran-2-methanol of the general formula:

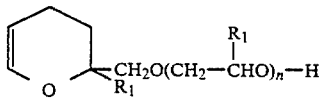

wherein $R_1$ and n are as hereinbefore defined. This class of compounds is prepared by the ethoxylation or propoxylation of 3,4-dihydropyran-2-methanol with a base catalyst such as potassium or sodium metals. The catalyst concentration can be from 0.1 weight percent to 0.4 weight percent, preferably from 0.2 weight percent to 0.3 weight percent based on the weight of the final product. The reaction can be carried out at a temperature of from about 75° C. to about 150° C., preferably from about 100° C. to about 120° C.

Another group of compounds which can be used in the compositions of this invention are the lactone adducts of 3,4-dihydropyran-2-methanol of the general formula:

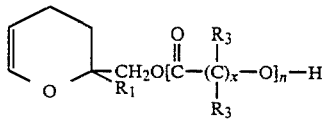

wherein $R_3$ is a hydrogen, alkyl, alkoxy, aryl, cycloalkyl, alkaryl, or aralkyl group having up to 12 carbon atoms and at least $(2X-3)$ of the $R_3$ groups are hydrogen atoms, x has a value of 2 to 12, and $R_1$ and n are as hereinbefore described. This class of compounds is prepared by reacting a lactone with 3,4-dihydropyran-2-methanol at a temperature of 100° C. to 200° C. A catalyst such as stannous octanoate on dibutyl tin dilurate and the like can be used to facilitate the polymerization. The lactones that can be used are epsilon-caprolactone, epsilon-methyl-epsilon-caprolactone, gamma-methyl-epsilon caprolactone, beta-propiolactone, deta-valerolactone, zeta-enantholactone, gamma-ethyl-epsilon-methyl-epsilon-caprolactone, and the like.

These lactone adducts of 3,4-dihydropyran-2-methanol may be reacted with alkylene oxides such as ethylene oxide or propylene oxide to from alkyleneoxide adducts of the lactone adducts of the general formula:

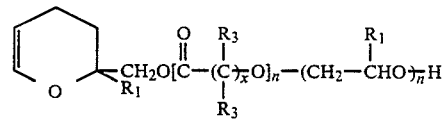

wherein $R_1$, $R_3''$, n, and x are as hereinbefore described.

Included in this class of compounds would be the lactone adducts of the alkylene oxide adducts of 3,4-dihydropyran-2-methanol of the general formula:

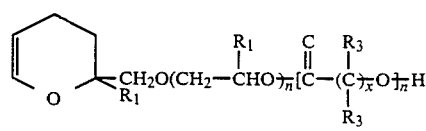

wherein $R_1$, $R_3$, n, and x are as hereinbefore described.

Still another group of compounds which can be used in the compositions of this invention are the esters of at least one organic carboxylic acid and 3,4-dihydropyran-2-methanol corresponding to the formula:

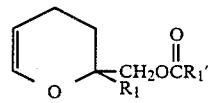

wherein $R_1$ and $R_1'$ are as hereinbefore defined. These compounds are prepared by conventional esterification or transesterification procedures with a suitable catalyst and can contain substituents in the molecule provided they do not unduly interfere with the reaction. These procedures and catalysts are well known to those skilled in the art and require no further elaboration. In the transesterification, the lower alkyl esters of organic acids are preferred sources of the acid moiety.

Another group of compounds which can be used are reaction products of the following:

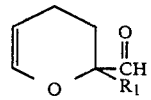

wherein $R_1$ is as previously defined with compounds such as pentaerythritol, formaldehyde, other aldehydes such as isobutyraldehyde to yield cyclic vinyl ether products as:

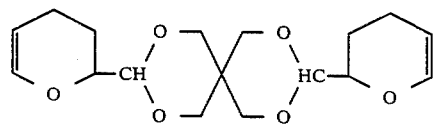

-continued

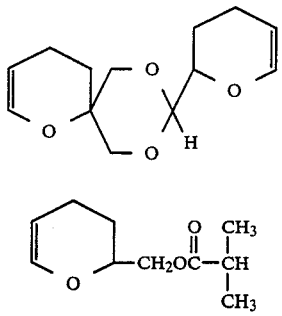

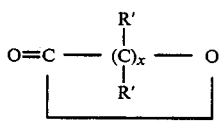

The urethane acrylate comprises the reaction product of a polyol, a multi-functional isocyanate, a lactone-acrylate adduct and/or an hydroxyalkyl acrylate or a mixture of a lactone-acrylate adduct and an hydroxyalkyl acrylate.

The urethane acrylate, for example, may be prepared by reacting a lactone-acrylate adduct with one or more of the following:
(a) a multi-functional isocyanate,
(b) a polyol and a multi-functional isocyanate,
(c) a polyol, a multi-functional isocyanate, and a hydroxyalkyl acrylate, or
(d) a polyol, a multi-functional isocyanate, an hydroxyalkyl acrylate and a reactive solvent.

The composition of this invention may additionally contain the reaction product of a polyol, a multi-functional isocyanate and an hydroxyalkyl acrylate and/or the reaction product of an hydroxyalkyl acrylate and a multi-functional isocyanate.

The lactone-acrylate adduct that is suitable for use in this invention is prepared by reacting a lactone with an hydroxyalkyl acrylate. The lactones suitable for use in preparing the lactone-acrylate adduct are characterized by the following formula:

$$O=C-(C)_x-O$$
with R' substituents on the (C)x wherein the R's are independently hydrogen or alkyl of from 1 to 12 carbon atoms, and x is from 4 to 7. The preferred lactone is epsilon-caprolactone.

The hydroxyalkyl acrylates used in this invention include 2-hydroxyethyl acrylate, hydroxypropyl acrylate, hydroxybutyl acrylate, 2-hydroxy-3-chloro-propyl acrylate, 2,3-hihydroxy propyl acrylate, hydroxyethyl acrylate and the like, or mixtures thereof. Hydroxyethyl acrylate is preferred.

The lactone-acrylate adduct is prepared by reacting the lactone with the hydroxyalkyl acrylate in the presence of less than about 200 parts per million of a catalyst. The catalyst which may be used includes one or more organometallic compounds and other metallic compounds such as stannic chloride or ferric chloride and other Lewis and protonic acids. Preferred catalysts include stannous octonoate, dibutyltin dilaurate, and other tin compounds; titanates such as tetraisopropyl titanate and butyl titanate; and the like.

The reaction is carried out at a temperature of from about 100° to about 140° C., preferably from about 120° to about 130° C. The reaction may be carried out at atmospheric pressure, although higher or lower pressures may be used. The reaction is generally carried out in the presence of oxygen to inhibit polymerization of the hydroxy-alkyl acrylate. The reaction is carried out for a period of from about 2 to about 20, preferably from about 3 to about 11 hours. The reaction is carried out in the presence of a suitable inhibitor to prevent polymerization of the hydroxyalkyl acrylate double bond. These inhibitors include the monomethyl ether of hydroquinone, benzoquinone, phenothiazine, methylhydroquinone, 2,5-di-ti-butylquinone, hydroquinone, and other common free radical inhibitors known in the art. The level of inhibitor used is less than 1000 parts per million, preferably less than 800 parts per million, and most preferably, less than 600 parts per million.

The lactone-acrylate adduct contains from one to about 10 moles of lactone per mole of hydroxyalkyl acrylate.

The multi-functional isocyanates suitable for use herein are known in the art and include the aliphatic and aromatic diisocyanates. Many such compounds are known to those skilled in the art and illustrative thereof one can mention 2,4-tolylene diisocyanate, 2,6-tolylene diisocyanate, isophorone diisocyanate, 4,4'-diphenylmethane diisocyanate, di(2-isocyanatoethyl)-bicyclo (2.2.1) hept-5-ene-2,3-dicarboxylate, 3,5,5-triethyl-1-isocyanato-3-isocyanato-methylcyclohexane, 1,6-hexamethylene diisocyanate, m- and p-xylene diisocyanate, cyclohexane-1,4-diisocyanate, dicyclohexyl-4,4'-methane diisocyanate, tetramethlene diisocyanate, cyclopentylene-1,3-diisocyanate, 1,3-diisocyanate, 1,4-xylylene diisocyanate, 1,5-naphthalene diisocyanate, m-phenylene diisocyanate, p-phenylene diisocyanate, hexamethylene diisocyanate, 3,3'-dimethyl-4,4'-diphenylmethane diisocyanate, 3,3'-dimethylbiphenylene diisocyanate, 4,4'-biphenylene diisocyanate, 3,3'-dimethoxy 4,4'-dimethyl 4,4'-biphenylene diisocyanate, durene diisocyanate, 1-phenoxy-2,4-phenylene diisocyanate, 1-tert-butyl-2,4-phenylene diisocyanate, 2,2,4-trimethylexamethylene diisocyanate, 1,3,5-benzene triisocyanate, 2,4,6-toluene triisocyanate, and the like, or mixtures thereof.

Also, included are reaction products of hydroxyalkyl acrylates and methacrylates with alkylene oxides such as alkylene oxide, propylene oxide and the like wherein one to about 20 moles of alkylene oxide are used per mole of acrylate.

Substantially any of the organic polyols previously used in the art to make coating compositions can be used in this invention. Illustrative of the polyols useful in producing coating compositions in accordance with this invention are the polyether polyols such as polyhydroxyalkanes and polyoxyalkylene polyols, the acrylic and vinyl polyols, the polyester polyols. the polycaprolactone polyols and other lactone polyols such as polyvalerolactone polyols, poly-methyl-caprolactone polyols, lactone copolymer polyols or ε-caprolactone/ε-methyl-ε caprolactone polyols, ε-caprolactone/eta-caprolactone polyols, and the like, etc., the polymer/polyols, and the like. Among the polyether polyols which can be employed are those selected from one or more of the following classes of compositions, alone or in admixture, known to those skilled in the art:
(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;

(d) Alkylene oxide adducts of polyphenols;
(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyether polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

The alkylene oxide adducts of phosphorus and polyphosphorus acids are another useful class of polyether polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

A still further useful class of polyether polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins, condensation products of various phenolic compounds and acrolein; the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol) ethanes, and the like.

The polyols described hereinabove can have hydroxyl numbers which vary over a wide range. In general, the hydroxyl numbers of the above described polyols employed in this invention can range from about 15, and lower, to about 900, and higher. The hydroxyl number is defined as the number of milligrams of potassium hydroxide required for the complete neutralization of the fully phthalated derivative prepared from 1 gram of polyol. The hydroxyl number can also be defined by the equation:

$$OH = \frac{56.1 \times 1000 \times f}{m.w.}$$

where
OH = hydroxyl number of the polyol;
f = functionality, that is, average number of hydroxyl groups per molecule of polyol; and
m.w. = molecular weight of the polyol.

The polyether polyols described hereinabove can be prepared by conventional methods and are commercially available from a number of manufacturers.

The polycaprolactone polyols, alone or in admixture, that can be used to prepare the coating compositions of this invention include any of the known polycaprolactone polyols that are commercially availabe and that are fully described, for example, in U.S. Pat. No. 3,169,945. As described in this patent the polycaprolactone polyols are produced by the ring-opening polymerization of an excess of a caprolactone and an organic polyfunctional initiator having as least two reactive hydrogen atoms. The organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, neopentyl glycol, 1,4-cyclohexanedimethanol, 2,4,4-trimethyl pentanediol, 2,2-dimethyl-3-hydroxypropyl 2,2-dimethyl-3-hydroxypropionate, and similar polyalkylene glycols, either blocked, capped or heteric, containing up to about 40 or more alkyleneoxy units in the molecule, 3-methyl-1-5-pentanediol, cyclohexanediol, 4,4'-methylene-bis-cyclohexanol, 4,4'-isopropylidene bis-cyclohexanol, xylenediol, 2-(4-hydroxymethylphenyl) ethanol, 1,4-butanediol, 1,6-hexanediol and the like; triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

$$R_1(OH)_x + O=C(C(R')_2)_4CHR' \longrightarrow$$

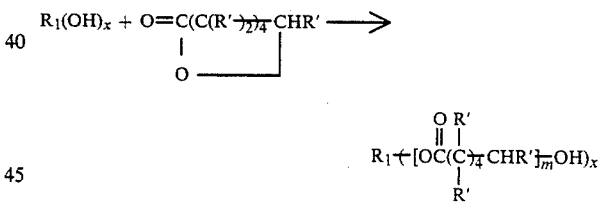

In this equation the organic functional initiator is the $R_1(OH)_x$ compound and the caprolactone is the

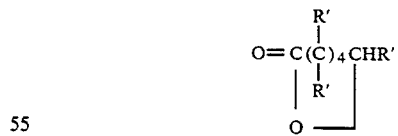

compound; this can be ε-caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 200 to about 6,000. The preferred polycaprolactone polyol compounds are those having an average molecular weight of from about 176 to about 6,000, most preferably from about 176 to 3,000. The most preferred are the polycaprolactone diol compounds having an average molecular weight of from about 176 to about 2,000 and the polycaprolactone triol and tetrol compounds having an average molecular weight of from about 248 to about 3,000. In the formula m is an integer representing the average number of repeating units needed to produce the compound having said molecular weights. The hydroxyl number of the polycaprolactone polyol can be from about 15 to 640, preferably from 200 to 500; and the polycaprolactone can have an average of from 2 to 8, preferably 2 to 6, hydroxyl groups.

Illustrative of polycaprolactone polyols that can be used in the coating compositions of this invention, one can mention the reaction products of a polyhydroxyl compound having an average from 2 to 8 hydroxyl groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compounds; this figure is shown in the third column.

| | POLYCAPROLACTONE POLYOLS | | |
|---|---|---|---|
| | Initiator | Average MW of polyol | Average No of CPL units in molecules |
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalene glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,398 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 835 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis(hydroxyethyl)-benzene | 736 | 5 |
| 27 | Glycerol | 548 | 4 |
| 28 | 1,2,6-Hexanetriol | 476 | 3 |
| 29 | Trimethylolpropane | 590 | 4 |
| 30 | Trimethylolpropane | 750 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |
| 35 | 1,4-Butanediol | 546 | 4.0 |
| 36 | Neopentyl glycol | 674 | 5.0 |

*Average molecular weight of glycol.

The structures of the compounds in the above tabulation are obvious to one skilled in the art based on the information given. The structure of compound No. 7 is idealized as:

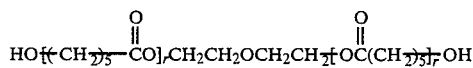

wherein the variable r is an integer, the sum of r+r has an average value of 3.7 and the average molecular weight is 527. The structure of compound No. 20 is idealized as:

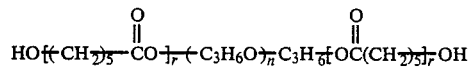

wherein the sum of r+r has an average value of 6 and the average molecular weight is 1,684. This explanation makes explicit the structural formulas of compounds 1 to 34 set forth above.

Polycaprolactone hexols suitable for use in the present invention can be prepared by the catalytic polymerization of an excess of polycaprolactone polyols and a cycloaliphatic epoxide. Illustrative polycaprolactone polyols useful in the preparation of polycaprolactone hexols include polycaprolactone diols, polycaprolactone triols and the like including mixtures thereof. Many of these polycaprolactone polyols are commercially available from Union Carbide Corporation. Cycloaliphatic epoxides suitable for use in preparing the polycaprolactone hexols include 3,4-epoxycyclohexylmethyl-3,4-epoxycyclohexane carboxylate, bis (3,4-epoxycyclohexylmethyl) adipate, vinyl cyclohexene dioxide and the like. Many of these cycloaliphatic epoxides are commercially available from Union Carbide Corporation. A suitable polymerization catalyst is diethylammonium triflate which is commercially available from the 3M Company as FC-520.

A preferred method for preparation of the polycaprolactone hexols comprises adding one or more polycaprolactone triols to a reactor, heating the polycaprolactone triols to a temperature of about 100° C. and adding the catalyst using a nitrogen sparge as soon as the polycaprolactone triols are molten. The polycaprolactone triols and catalyst mixture is then heated to a temperature of from about 150° C. to about 200° C. and a cycloaliphatic epoxide is added to the mixture. The reaction is carried out for about one hour to about three hours or until the oxirane content has been reduced to a nil or almost a nil value. A modification of this process can involve initially adding all of the ingredients into the reactor. A further modification of this method can involve a vacuum treatment of from 10 to 30 minutes after the catalyst addition and/or the use of a vacuum during the heating of the polycaprolatone triols to a molten state.

The polymer/polyols that can be used to prepare the composition of this invention are known materials. Such polymer/polyols can be produced by polymerizing one or more ethylenically unsaturated monomers dissolved or dispersed in a base polyol in the presence of a free radical catalyst. The production of polymer/polyols is more fully described in U.S. Pat. Reissue No. 28,715, U.S. Pat. Reissue No. 29,118, U.S. Pat. No. 3,652,639, U.S. Pat. Reissue No. 29,014, U.S. Pat. No. 3,950,317, U.S. Pat. No. 4,208,314, U.S. Pat. No. 4,104,236, U.S. Pat. No. 4,172,825 and U.S. Pat. No. 4,198,488.

While poly(oxypropylene) polyols are preferred, substantially any of the polyols previously used in the art to make polymer/polyols can be used as the base polyol. Illustrative of the base polyols useful in producing polymer/polyol compositions are the polyether polyols such as polyhydroxyalkanes and polyoxyalkylene polyols, or the like. Among the base polyols which can be employed are those selected from one or more of the following classes of compositions, alone or in admixture, known to those skilled in the art and described more fully hereinabove:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil, and the like.

The most preferred base polyols employed in the polymer/polyols which are useful as ingredients in the coating compositions of this invention include the poly(oxypropylene) polyols. It should be appreciated that a blend or mixture of more than one base polyol can be utilized, if desired, to form the polymer/polyol.

Conceptually, the monomers used in preparing the polymer/polyols can comprise any ethylenically unsaturated monomer or monomers. A variety of monomers are disclosed in the patents relating to polymer/polyols previously referred to. The selection of the monomer or monomers used will depend on considerations such as the relative cost of the monomers and the product characteristics required for the intended application.

The preferred monomer and monomer mixture used to make the polymer portion of the polymer/polyols is acrylonitrile and a mixture of acrylonitrile and styrene respectively. The relative weight proportions of acrylonitrile to styrene can range from about 80:20 to about 20:80. It may be desirable in some applications to utilize, with acrylonitrile, a comonomer other than styrene. Representative examples of suitable comonomers include methyl methacrylate, vinyl chloride and vinylidene chloride.

The polymer and polyol content of the polymer/polyols can vary within wide limits, depending upon the requirements of the anticipated end use application. In general, the polymer content will vary from about 10 to about 50 percent, based upon the weight of the polymer/polyol. The polyol content of the polymer/polyols varies from about 50 to about 90 percent, based upon the weight of the polymer/polyol.

The polymer/polyols may, if desired, be blended with other conventional polyols described hereinabove to reduce the polymer content to the level desirable for the particular end use application. Blends in which the resulting polymer content is as low as 4 percent of the total weight of the blend or even less may be useful in the coating compositions of this invention.

The most preferred classes of polyols employed in the coating compositions of this invention are the polycaprolactone polyols such as TONE-0200, TONE-0210, TONE-0230, TONE-0240, TONE-0260, TONE-0301, TONE-0310, TONE-0225, TONE-0190 and TONE-0305 commercially available from Union Carbide Corporation, the dihydroxyl functional polytetramethylene oxide polyols such as Polymeg 650, 1000 and 2000 commercially available from Quaker Oats Company, the polymer/polyols such as NIAX Polymer Polyol 31-23 and 34-28 commercially available from Union Carbide Corporation, and of course the ethylene oxide and propylene oxide adducts including ethylene glycol, diethylene glycol, the poly(oxyethylene) glycols, the poly(oxypropylene) glycols, triols and higher functionality polyols such as LHT-67, LHT-112, and LG-56 commercially available from Union Carbide Corporation. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, such as the propylene oxide polyols capped with ethylene oxide, i.e., NIAX Polyol 11-27 and 11-34 and E-474, commercially available from Union Carbide Corporation, or may be randomly distributed along the polymer chain. As is well known in the art, the polyols that are most preferred herein contain varying small amounts of unsaturation. Unsaturation in itself does not affect in any adverse way the formation of the coating compositions in accordance with the present invention.

Other preferred representative examples of organic polyols that may be employed in the coating compositions of this invention include copolymers of hydroxypropyl and hydroxyethyl acrylates and methacrylates with other free radically polymerizable monomers such as acrylate esters, vinyl halides, vinyl acetate or styrene; copolymers containing pendent hydroxy groups formed by hydrolysis or partial hydrolysis of vinyl acetate copolymers, polyvinylacetal resins containing pendent hydroxyl groups; modified cellulose polymers such as hydroxyethylated and hydroxypropylated cellulose; hydroxy terminated polyesters, hydroxy terminated polyalkadienes, and styrene alkyl alcohol copolymers. The polyester polyols are the reaction products of polyfunctional organic carboxylic acids and polyhydric alcohols and include, for example, poly(hexamethylene adipate), poly(ethylene adipate), poly(butylene adipate) and the like. Many of these organic polyols can be prepared by conventional methods and are commercially available from a number of manufacturers such as polyvinylacetal resins commercially available from Monsanto Chemical Company as Butvar B-72A, B-73, B-76, B-90 and B-98 and as Formvar 7/70, 12/85, 7/95S, 7/95E, 15/95S and 15/95E; an aliphatic polyester diol commercially available from Rohm and Haas as Paraplex U-148; saturated polyester polyols commercially available from Mobay Chemical Company as Multron R-2, R-12A, R-16, R-18, R-38, R-68, and R-74; a hydroxypropylated cellulose having an equivalent weight of approximately 100 commercially available from Hercules, Inc. as Klucel E; and a cellulose acetate butyrate ester having a hydroxyl equivalent weight of approximately 400 commercially available from Eastman Kodak as Alcohol Soluble Butyrate.

Another preferred class of polyols utilized in this invention are polyester polyols as described in U.S. patent application Ser. No. 469,433 filed in the name of L. A. Domeier et al on Feb. 24, 1983, titled "Polyester Polyols Based On Lactones" and assigned to the same assignee as this application.

The polyester polyols as described in said application has a molecular weight of less than about 3000 and is produced from the ring opening reaction of a lactone with a polyfunctional initiator, wherein the minimum percent of lactone hydroxyls, $y$, (i.e. those hydroxyls attached to an open lactone) in the polyester polyols is a function of the mole ratio, x, of lactone units to active hydrogens in the initiator and can be defined as $y=52.5x$ for $x>0$ to 1.5 and $y=2.11x+75.6$ for $x>1.5$.

The polyester polyol are prepared by the ring opening reaction of a lactone with a polyfunctional initiator. The preferred lactone is ε-caprolactone. The initiators are of the formula $$A(BH)_a$$

in which A is an organic radical selected from the group consisting of aliphatic, cycloaliphatic, aromatic and heterocyclic radicals, a is a number equal to the functionality of the initiator, and the B is selected from —O—, —NH—, —NR²— (R² is selected from alkyl, aryl, aralkyl or cycloalkyl), —S—, and —C(O)O—.

The type of BH groups in a single initiator may be identical or may vary as in aminoalcohols, hydroxycarboxylic acids, and the like.

Preferred initiators are organic polyols in which the BH groups are hydroxyl groups.

The molecular weight (number average, Mn) of the polyol product is less than about 3000, and preferably less than about 1500.

The reaction of the lactone and the polyfunctional initiator is preferably carried out in the presence of a catalyst.

The catalysts which may be used include one or more organometallic compounds and other metallic compounds such as stannous chloride and other Lewis and protonic acids. Preferred catalysts include stannous octanoate, dibutyltin dilaurate, and other tin compounds; titanates such as tetraisopropyl titanate and butyl titanate; and the like. Any of the catalysts commonly used in ring-opening polymerizations of lactones may be used in the practice of this invention.

The catalyst is used in conventional amounts of from about 0.1 to 50 parts per million based on the total weight of the lactone.

The reaction may be effected in a solvent which must be free of active hydrogen groups such as hydrocarbon solvents. The reaction is preferably carried out neat, in the absence of any solvent.

The reaction may be carried out at atmospheric pressure, although higher or lower pressures may be used.

The reaction is carried out at a temperature of from about 100° to about 200° C., preferably from about 140° to about 170° C. The reaction is carried out for a period of from about 1 to about 24 hours, preferably from about 3 to about 8 hours. It is important to avoid extended reaction times and excessive reaction temperatures which lead to a gradual decrease in the percent of lactone hydroxyl groups.

The organic polyol utilized in the composition of this invention can be mixtures or blends of organic polyols. For example, when utilizing a polycaprolactone polyol, it may be desirable to mix or blend one or more of a propylene oxide polyol, a propylene oxide polyol capped with ethylene oxide, a polytetramethylene oxide polyol or a polymer/polyol therewith. Other mixtures or blends may similarly be used if desired.

The cyclic vinyl ether containing compound is used in amounts of from 1 to about 99, preferably from about 5 to about 95, and the urethane acrylate is used in amounts of from about 99 to 1, preferably from about 95 to about 5 parts.

The photoinitiators which may be used herein include one or more of a metal fluoroborate and a complex of boron trifluoride, as described in U.S. Pat. No. 3,379,653; a bis(perfluoroalkylsulfonyl) methane metal salt, as described in U.S. Pat. No. 3,586,616; an aryldiazonium compound, as described in U.S. Pat. No. 3,708,296; an aromatic onium salt of Group VIA elements, as described in U.S. Pat. No. 4,058,400; an aromatic onium salt of Group VA elements, as described in U.S. Pat. No. 4,069,055; a dicarbonyl cheleate of a Group IIIA-VA element, as described in U.S. Pat. No. 4,086,091; a thiopyrylium salt, as described in U.S. Pat. No. 4,139,655; a Group VIA element having an $MF_6^-$ anion where M is selected from P, As and Sb, as described in U.S. Pat. No. 4,161,478; a triarylsulfonium complex salt, as described in U.S. Pat. No. 4,231,951; and an aromatic iodonium complex salt and an aromatic sulfonium complex salt, as described in U.S. Pat. No. 4,256,828. Preferred photoinitiators include triarylsulfonium complex salts, aromatic sulfonium or iodonium salts of halogen-containing complex ions, and aromatic onium salts of Group IIIA, VA and VIA elements. Some of such salts are commercially available, such as FC-508 and FC-509 (available from Minnesota Mining and Manufacturing Company), and UVE-1014 (available from General Electric Company).

The photoinitiators are used in conventional amounts in the compositions of this invention such as in amounts from about 0.1 to 30 parts by weight per 100 parts by weight of the epoxides.

The compositions herein may include additives such as oils, particularly silicone oil, surfactants such as silicone-alkylene oxide copolymers and acrylic polymers, such as the Modaflows (obtained from Monsanto Chemical Co.), silicone oil containing aliphatic epoxide groups, fluorocarbon surfactants; low molecular weight alcohols; cellosolves, such as butyl cellosolve; carbitols, such as butyl carbitol and diethyleneglycol, and the like.

If desired, one may include in the compositions of this invention various conventional non-basic fillers (e.g., silica, talc, glass beads or bubbles, clays, powdered metal such as aluminum, silver, zinc oxide, etc.) and other additives such as viscosity modifiers, rubbers, tackifying agents, pigments, and the like.

The photocopolymerizable compositions are particularly suitable in a variety of applications in the fields of protective coatings and graphic arts due to their flexibility, impact resistance, abrasion-resistance, hardness and adhesion to rigid, resilient and flexible substrates such as metal, plastic, rubber, glass, paper, wood, and ceramics.

The photopolymerization of the compositions of the invention occurs upon exposure of the compositions to any source of radiation emitting actinic radiation at a wavelength within the ultraviolet and visible spectral regions. Suitable sources of radiation include mercury, xenon, carbon arc lamps, sunlight, etc. Exposures may be from less than about 1 second to 10 minutes or more depending upon the amounts of particular polymerizable materials and photoinitiator being utilized and depending upon the radiation source and distance from the source and the thickness of the coating to be cured. The compositions may also be photopolymerized by exposure to electron beam irradiation. Generally speaking the dosage necessary is from less than 1 megarad to 100 megarads or more.

The compositions of this invention may be prepared simply by mixing the formulation ingredients together, preferably under "safe light" conditions when the photoinitiator is incorporated.

EXAMPLES

The following Examples serve to give specific illustration of the practice of this invention but they are not intended in any way to act to limit the scope of this invention.

The following designations used in the Examples have the following meaning:

Tetramer:

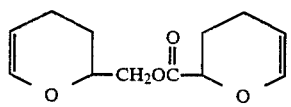

Surfactant: A silicone surfactant with the structure

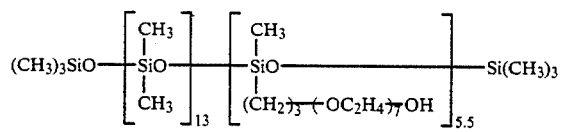

Photoinitiator I: UVE-1014, a solution of a triarylsulfonium hexafluoroantimony salt with a specific gravity of 1.39 and Brookfield viscosity of 74 centipoise (obtained from General Electric Co.).

Photoinitiator II: FC-508, a solution of a triarylsulfonium hexafluorophosphate with a specific gravity of 1.33 and Brookfield viscosity of 40,000 to 60,000 centipoise (obtained from Minnesota Mining and Manufacturing Company).

Photoinitiator III: 2,2-dimethoxy-2-phenyl-acetophenone (Irgacure 651 obtained from Ciba-Geigy).

The procedures used to test coatings cured with the compositions of this invention were as follows:

Solvent Resistance (Double Acetone Rubs): a measure of the resistance of the cured film to attack by acetone in which a film coating surface was rubbed with an acetone soaked cheese cloth back and forth with hand pressure. A rub back and forth with hand pressure over the film coating surface with the acetone soaked cheesecloth was designated as one "double acetone rub". The effect that a certain number of double acetone rubs had on the film coating surface was reported by a number in parenthesis following the number of double acetone rubs. The rating system fro evaluating acetone resistance for a given number of double acetone rubs was as follows:

Number in Parenthesis After Number of Rubs:
(1) No change in coating appearance.
(2) Scratched surface.
(3) Dulled, marred, some coating removed.
(4) Breaks in coating appearance.
(5) About one-half of the coating removed.

Pencil Hardness—ASTMD-3363-74:

The rating system for pencil hardness was as follows:

6B-5B-4B-3B-2B-B-HB-F-H-2H-3H-4H-5H-6H
Softer                                    Harder Crosshatch adhesion: refers to a test using 10 parallel, single-edge, razor blades to scribe test films with 2 sets of perpendicular lines in a crosshatch pattern. Ratings are based on the amount of film removed after applying and subsequently pulling a contact adhesive tape (Scotch Brand 606) away from the surface of a scribed coating at a 90 degree angle in a fast, rapid movement. It is important to carefully apply and press the tape to the scribed coating to eliminate air bubbles and provide a good bond because adhesion is reported as the percent of film remaining on the substrate with a 100 percent rating indicating complete adhesion of the film to the substrate.

Reverse of face impact resistance: measures the ability of a given film to resist rupture from a falling weight. A Gardner Impact Tester using an eight-pound dart is used to test the films cast and cured on the steel panel. The dart is raised to a given height in inches and dropped onto the reverse or face side of a coated metal panel. The inches times pounds, designated inch-pounds, absorbed by the film without rupturing is recorded as the reverse or face impact resistance of the film.

EXAMPLES 1 to 3

Urethane Acrylate Oligomer No. 1 was prepared by charging a 4-neck, glass reaction flask with 129 grams of isophorone diisocyanate, 150 grams of hexanediol diacrylate, and 0.4 gram of dibutyltindilaurate. This mixture was heated to 45° C. and 154 grams of a caprolactone polyol having an average hydroxyl number of about 212 mg KOH/g polyol and an average molecular weight of about 530 were added while maintaining the mixture temperature at 45°–55° C. Then, 67.5 grams of hydroxyethylacrylate were added in a dropwise manner while again maintaining the temperature between 45° and 55° C. The temperature was held in this range until the free isocyanate content was less than 0.1 percent by weight. Then, 0.5 gram of the monomethylether of hydroquinone was added as a stabilizer and the urethane acrylate oligomer was collected as a residue product for further use. Mixture 1 was prepared by mixing 99 parts by weight of Urethane Acrylate Oligomer No. 1 with 1 part of Photoinitiator III. Mixture 2 was prepared by blending 24.4 grams Tetramer, 0.5 gram of Photoinitiator I, and 0.1 gram of Surfactant. Mixture 3 was prepared by blending 11.9 grams of Tetramer, 12.0 grams of 3,4-epoxycyclohexylmethyl-3,4-epoxycyclohexanecarboxylate (ERL-4221 obtained from Union Carbide Corporation), 1.0 gram of Photoinitiator II, and 0.1 gram of Surfactant. The mixtures were then combined and blended into the formulation described in Table I. The formulations were then coated onto a Bonderite 37 steel panel with a No. 20 wire-wound rod and photcured with a 100 watt/inch. mercury-vapor light source at a rate of 30 fpm. The atmosphere used during the curing process is given in Table I.

TABLE 1

| Ingredient | Example | | |
|---|---|---|---|
| | 1 | 2 | 3 |
| Mixture 1, g. | 2.5 | 2.5 | 2.5 |
| Mixture 2, g. | 2.5 | — | — |
| Mixture 3, g. | — | 2.5 | 2.5 |
| Cure Atmosphere | Nitrogen | Nitrogen | Air |
| Properties | | | |
| Double Acetone Rubs | >100 | >100 | >100 |
| Pencil Hardness | H | H | H |
| % Crosshatch Adhesion | 100 | 100 | 100 |
| Gardner Impact | | | |
| Face, in. lbs. | 25 | 125 | 125 |

TABLE 1-continued

| Ingredient | Example | | |
|---|---|---|---|
| | 1 | 2 | 3 |
| Reverse. in. lbs. | <5 | 75 | 70 |

Example 1

Describes the polymeric system obtained by curing acrolein tetramer, a polyurethane acrylate, and a diacrylate in an inert (nitrogen) atmosphere.

Example 2

Describes a polymeric system obtained by curing acrolein tetramer, polyurethane acrylate, a diacrylate, and ERL-4221 in an inert (nitrogen) atmosphere.

Example 3

Same as 2 except an air atmosphere was used.

EXAMPLES 4-7

Urethane Acrylate Oligomer No. 2 was prepared in the same manner as described above except the following ingredients were used.

| Isophorone Diisocyanate | 56.9 g. |
|---|---|
| Caprolactone Polyol (dihydroxy functional, MW = 2000, OH No. = 56.1) | 416.0 g. |
| Cyclohexanone | 208.4 g. |
| Dibutyltindilaurate | 42 drops |
| Hydroxyethylacrylate | 13.3 g. |
| Monomethyl ether of hydroquinone | 0.5 g. |

Mixture 4 and 5 were then prepared by combining the following ingredients and mixing them well by simple stirring.

| Ingredient | Mixture | |
|---|---|---|
| | 4 | 5 |
| Acrolein Tetramer, g. | 16.4 | 18.9 |
| Polymeg 650, g. | 7.5 | — |
| Polymeg 2000, g. | — | 5.0 |
| UVE-1014 Photoinitiator, g. | 0.5 | 0.5 |
| FC-171 Surfactant, g. | 0.1 | 0.1 |

The following materials were combined in an amber glass bottle and well mixed. After mixing, the systems were coated onto Bonderite 37 steel panels with a Number 20 wire-wound rod and then cured with a 300 watt-/inch ultra-violet light source.

| | Example | | | |
|---|---|---|---|---|
| | 4 | 5 | 6 | 7 |
| Urethane Acrylate Oligomer 2, g. | 5 | 3 | 5 | 3 |
| Mixture 4, g. | 5 | 7 | — | — |
| Mixture 5, g. | — | — | 5 | 5 |
| Irgacure 651, g. | 0.05 | 0.03 | 0.05 | 0.03 |
| Cure Atmosphere | ←Air→ | | | |
| Properties (No Post Cure) | | | | |
| Double Acetone Rubs | — | 25 | — | 13 |
| Pencil Hardness | — | H | — | H |
| % Crosshatch Adhesion | — | 100 | — | 100 |
| Gardner Impact | | | | |
| Face, in. lbs. | — | >320 | — | >320 |
| Reverse, in. lbs. | — | >320 | — | >320 |
| Properties After 10 min. @ 150° C. | | | | |
| Double Acetone Rubs | >100 | >100 | >100 | >100 |
| Pencil Hardness | HB | H | H | H |
| Crosshatch Adhesion | 100 | 100 | 100 | 100 |

-continued

| | Example | | | |
|---|---|---|---|---|
| | 4 | 5 | 6 | 7 |
| Gardner Impact | | | | |
| Face, in. lbs | >320 | >320 | >320 | >320 |
| Reverse in. lbs. | >320 | >320 | >320 | >320 |

Example 4-7 describe cominations of a cyclic vinyl ether (acrolein tetramer) with polyether polyols and urethane acrylates.

What is claimed is:

1. A photocurable coating composition comprising a dihydropyranyl or di(dihydropyranyl) compound; a urethane acrylate prepared by reacting a polyol and a multi-functional isocyanate with a lactone-acrylate adduct or hydroxyalkyl acrylate or mixture thereof; and a photoinitiator selected from the group consisting of aromatic iodonium salts of halogen-containing complex ions, and aromatic onium salts of Group IIIA, VA and VIA elements.

2. A composition as defined in claim 1 wherein the cyclic vinyl ether containing compound is selected from the following:

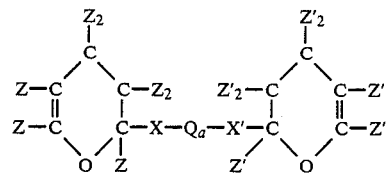

Z and Z' each represents hydrogen or an alkyl group having from 1 to 10, and usually no more than 6, carbon atoms;

X and X' are members of the class consisting of a bivalent saturated hyrocarbon group, R, having the structure, $—C_nH_{2n}—$, wherein n is an integer having a value of from 1 to 10; an oxy radical, —O—; and carbonyl group, —C(O)—; and, in addition X' may be a carbonyloxy group, —O(O)C—, the carbon atom of which is bonded to the 2-position of the dihydropyranyl ring; X and X' may be the same or different provided that taken together they contain either zero or 2 oxygen atoms;

a has a value of from zero to 1, a being zero only when X' is the aforesaid carbonyloxy group;

Q is a member of the class consisting of the aforesaid R group; a dioxylakylene group, —ORO—, wherein R is a defined above; a dicarboxylate group, —OC—(O)—R'—C(O)O,— wherein R' is the nucleus of a dicarboxylic acid; and a polycarbamate group such as the dicarbamate group, —OC(O)NH—R''—NH—C(O)O—, wherein R'', as illustrated, is the nucleus of a diisocyanate; and X, X' and Q taken together are such that the linking chain, —X—Q—X'—, contains an even number of oxygen atoms from two to four, provided that when X and X' are both oxy radicals, the linking chain contains no other oxygen atoms (that is Q or R), and when X and X' are both carbonyl groups, the linking chain contains four oxygen atoms (that is, Q is —ORO—).

3. A composition as defined in claim 1 wherein the cyclic vinyl ether containing compound is a 3,4-dihydro-2H -pyran-2-methyl(3,4-dihydro-2H-pyran2-carboxylate) having the formula:

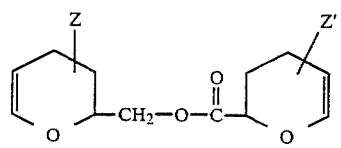

wherein Z and Z' each represents hydrogen or an alkyl group having from 1 to 10 carbon atoms.

4. A composition as defined in claim 1 wherein the cyclic vinyl ether containing compound is an alkanedioxy-bis(3',4'-dihydro-2'H-pyran-2'-carbonyl) compound having the formula:

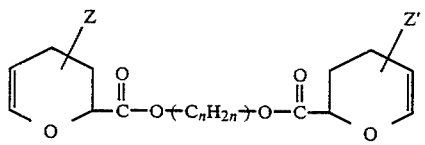

wherein Z and Z' each represents hydrogen or an alkyl group having from 1 to 10 carbon atoms and n is an integer from 1 to 10.

5. A composition as defined in claim 1 wherein the cyclic vinyl ether containing compound is a bis-(3',4'-dihydro-2'H-pyran-2'-oxy)alkane having the formula:

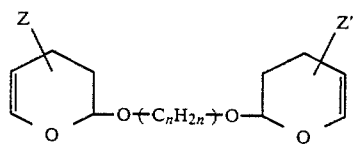

wherein Z and Z' each represents hydrogen or an alkyl group having from 1 to 10 carbon atoms and n is an integer from 1 to 10.

6. A composition as defined in claim 1 wherein the cyclic vinyl ether containing compound is a bis-(3',4'-dihydro-2'H-pyran-2'-alkoxy)alkane having the formula:

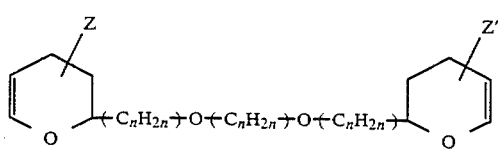

wherein Z and Z' each represents hydrogen or an alkyl group having from 1 to 10 carbon atoms and each n is an integer from 1 to 10.

7. A composition as defined in claim 1 wherein the cyclic vinyl ether containing compound is a bis-(3',4'-dihydro-2'H-pyran-2'-alkyl) carboxylate having the formula:

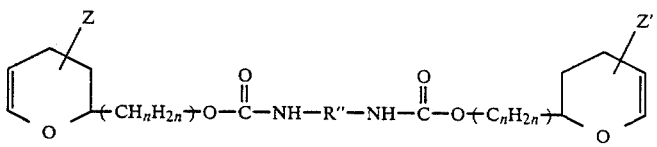

wherein Z and ' each represents hydrogen or an alkyl group having from 1 to 10 carbon atoms, each n is an integer from 1 to 10 and R' is the nucleus of a dicarboxylic acid and may be a bivalent aliphtic, or cycloaliphatic or aromatic nucleus including corresponding halogen-substituted nuclei.

8. A composition as defined in claim 1 wherein the cyclic vinyl ether containing compound has the formula:

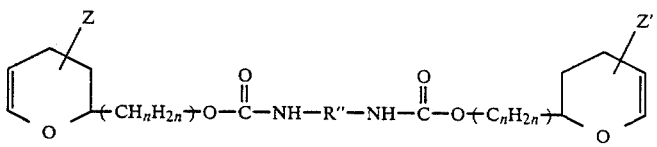

wherein Z and Z' each represents hydrogen or an alkyl group having from 1 to 10 carbon atoms, each n is an integer from 1 to 10 and R" is an aliphtic, cycloaliphatic or aromatic radical which may be unsubstituted hydrocarbyl groups or hydrocarbyl groups substituted with halogen or alkoxy groups.

9. A composition as defined in claim 1 wherein the cyclic vinyl ether containing compound is an alkylene oxide adduct of 3,4-hydropyran-2-methanol of the formula:

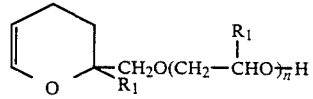

wherein $R_1$ is hydrogen or methyl and n has a value of from 1 to 50.

10. A composition as defined in claim 1 wherein the cyclic vinyl ether containing compound is selected from one or more of the following:

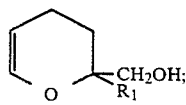

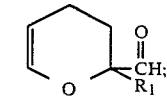

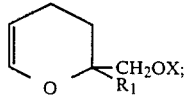

wherein $R_1$ is hydrogen or methyl and X is selected from

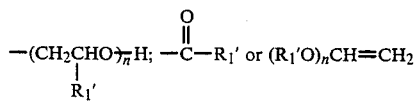

wherein n has a value of from 1 to 50 and wherein $R_1'$ is (1) hydrogen, (2) alkyl which is substituted with any substituent which does not unduly interfere with the polymerization, or unsubsitituted, linear or branched, containing up to 20 carbon atoms, and (3) aryl which is substituted with any substituent which does not unduly interfere with the polmerization or, which is unsubstituted, having 6 to 10 ring carbon atoms.

11. A composition as defined in claim 1 wherein the cyclic vinyl ether containing compound is of the formula:

wherein $R_1$ is hydrogen or methyl, $R_3$ is hydrogen, an alkyl, alkoxy, aryl, cycloalkyl, alkaryl or aralkyl group having up to 12 carbon atoms and at least (2x-3) of the $R_3$ groups are hydrogen, x has a value of 2 to 12 and each n has a value of 1 to 50.

12. A composition as defined in claim 1 wherein the cyclic vinyl ether containing compound is of the formula:

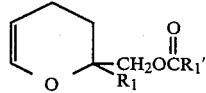

wherein $R_1$ is hydrogen or methyl and $R'_1$ is (1) hydrogen, (2) alkyl which is substituted with any substituent which does not unduly interfere with the polymerization, or unsubstituted, linear or branched, containing up to 20 carbon atoms, and (3) aryl which substituted with any substituent which does not unduly interfere with the polymerization or, which is unsubstituted, having 6 to 10 ring carbon atoms.

13. A composition as defined in claim 1 wherein the cyclic vinyl ether containing is of the formula:

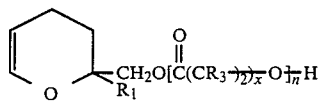

wherein Rqhd 1 is hydrogen or methyl, $R_3$ is hydrogen, an alkyl, alkoxy, aryl, cycloalkyl, alkaryl or aralkyl group having up to 12 carbon atoms and at least (2x-3) of the $R_3$ groups are hydrogen, x has a value of 2 to 12 and n has a value of 1 to 50.

14. A composition as defined in claim 1 wherein the cyclic vinyl ether containing compound is of the formula:

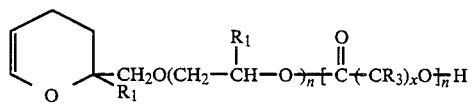

wherein $R_1$ is hydrogen or methyl, $R_3$ is hydrogen, an alkyl, alkoxy, aryl, cycloalkyl, alkaryl or aralkyl group having up to 12 carbon atoms and at least (2x-3) of the $R_3$ groups are hydrogen, x has a value of 2 to 12 and each n has a value of 1 to 50.

15. A composition as defined in claim 1 wherein the cyclic vinyl ether containing compound is of the formula:

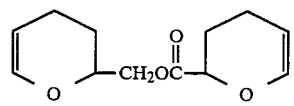

16. A composition as defined in claim 1 wherein the cyclic vinyl ether containing compound is of the formula:

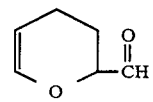

17. A composition as defined in claim 1 which contains a poly(active hydrogen) organic compound.

18. A composition as defined in claim 17 wherein the poly(active hydrogen) organic compound is selected from the group consisting of a polyether polyol, a polycaprolactone polyol, a polyester polyol, polyols comprsising the polymerization product of hdroxyetheyl and hydroxypropyl acrylates and methacrylates with other free radical polymerizable monomers, polyols formed by hydrolysis of vinyl acetate copolymers, and polyols prepared by polymerizing ethylenically unsaturated monomers in a base polyol selected from the group consisting of polyhydroxyalkanes and polyoxylakylene polyols.

* * * * *